UNITED STATES PATENT OFFICE.

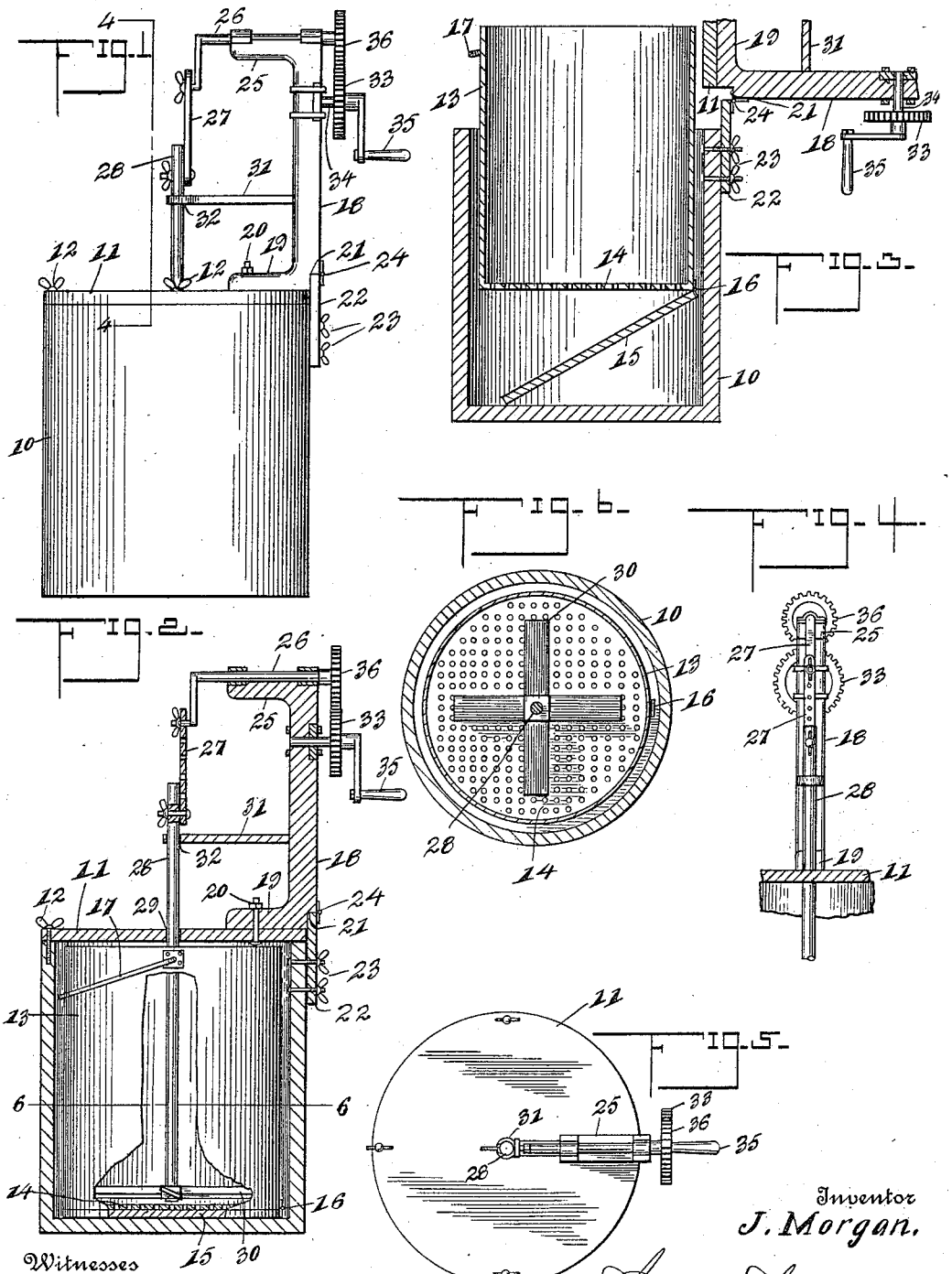

JOSEPH MORGAN, OF NEW ORLEANS, LOUISIANA.

BUTTER-CHURN.

1,069,492.  Specification of Letters Patent.  Patented Aug. 5, 1913.

Application filed October 31, 1912. Serial No. 728,924.

*To all whom it may concern:*

Be it known that I, JOSEPH MORGAN, a citizen of the United States, residing at New Orleans, in the parish of Orleans, State of Louisiana, have invented certain new and useful Improvements in Butter-Churns; and I do hereby declare the following to be a full, clear, and exact description of the invention, such as will enable others skilled in the art to which it appertains to make and use the same.

This invention relates to churns and has for an object to provide a churn having a novel dasher actuating means carried by a standard which is fixed to the churn cover and is hinged to the churn body, whereby the cover and dasher may be rocked back to permit withdrawal of the butter receptacle.

A further object of the invention is to provide a churn having a novel butter receptacle which is provided with a screen bottom and a hinged imperforate bottom outside of the screen bottom, the hinged bottom gravitating to open position upon the receptacle being raised from the churn body whereby butter is retained in the receptacle and the milk escapes therefrom in the churn body.

With the above objects in view the invention consists of certain novel details of construction and combination of parts hereinafter fully described and claimed, it being understood that various modifications may be made in the minor details of construction within the scope of the appended claim.

In the accompanying drawing forming part of this specification:—Figure 1 is a side elevation of a churn embodying my improvements. Fig. 2 is a vertical sectional view through the churn, with portions in elevation. Fig. 3 is a vertical sectional view through the churn showing the butter receptacle raised and the cover rocked open. Fig. 4 is a vertical sectional view taken on the line 4—4 Fig. 1. Fig. 5 is a plan view of the churn. Fig. 6 is a cross sectional view taken on the line 6—6 Fig. 2.

Referring now to the drawing in which like characters of reference designate similar parts, 10 designates a substantially cylindrical churn body which is closed by a circular cover 11, there being butterfly screws 12 passed through the cover and into the top edge of the body to tightly screw the cover to the body.

Within the body is inserted a cylindrical pail 13 having a screen bottom 14 and further having an imperforate bottom 15 outside of the screen bottom, the imperforate bottom being hinged at one edge to the cylindrical wall of the pail by a hinge 16. The pail is further provided with a bail 17. This pail is the butter receptacle, that is the milk is poured into this pail after insertion of the latter in the churn, and the churn dasher works in this pail to form the butter. After the butter is formed the pail may be lifted by the bail from the churn body, the cover gravitating to open position in the meantime, and facilitating the escape of the milk into the churn body, the screen bottom retaining the butter in the pail.

The dasher support and actuating means comprises a standard 18 having a securing foot 19 which is designed to be securely bolted to the cover as shown at 20 with the outer edge of the standard projecting over the outer edge of the churn body. A notch 21 is formed in the lower surface of the floor of the outer corner of the standard and receives one end of an arm 22 which extends downwardly along the outer face of the churn body and is secured to the latter by means of bolts 23. A hinge 24 connects the standard to this arm. Upon the butterfly screws 12 of the cover being loosened, the standard with attached cover may be rocked outwardly as shown in Fig. 3 to expose the butter receptacle 13 and permit of the latter being raised from the churn body.

The standard is equipped at the upper end with an arm 25 which overhangs the foot, and upon this arm is journaled a crank shaft 26. A pitman 27 is connected to the crank of the crank shaft, and is connected to a dasher rod 28 which projects through a central opening 29 in the cover and is equipped below the cover with a dasher 30. A guide arm 31 is secured to the standard and is provided at the end with an eye 32 which encircles the dasher rod. A driving gear 33 is journaled on the stub shaft 34 carried on the outer face of the standard and is equipped with a crank handle 35. A driven pinion 36 is fixed to the crank shaft 26 and meshes with the driving gear. Upon rotation of the crank handle the dasher will be reciprocated through the instrumentality of the above described driving mechanism, and during such reciprocation will form the butter in the butter receptacle in the usual manner.

What is claimed, is:—

In a churn, a body, a butter receptacle within said body, a screen bottom for said receptacle, an imperforate bottom hinged to said receptacle below said screen bottom and adapted to gravitate to open position upon said receptacle being raised in said body, a cover for said body, a dasher extending through said cover into said receptacle, and means for actuating said dasher.

In testimony whereof, I affix my signature, in the presence of two witnesses.

JOSEPH MORGAN.

Witnesses:
JOHN RICHARD,
O. S. THOMPSON.

Copies of this patent may be obtained for five cents each, by addressing the "Commissioner of Patents, Washington, D. C."